Oct. 29, 1935.  P. J. BERRY  2,018,829
HEADLIGHT
Filed Dec. 22, 1933   2 Sheets-Sheet 1
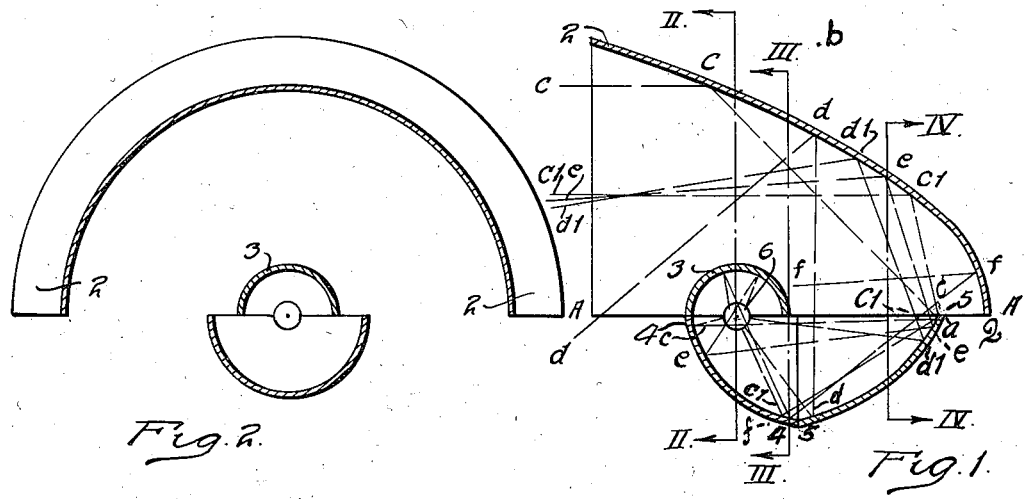
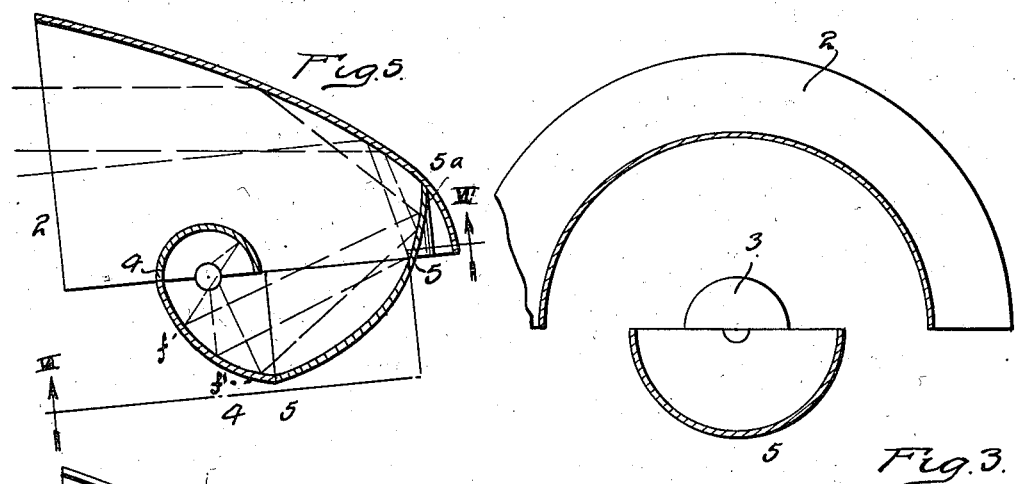
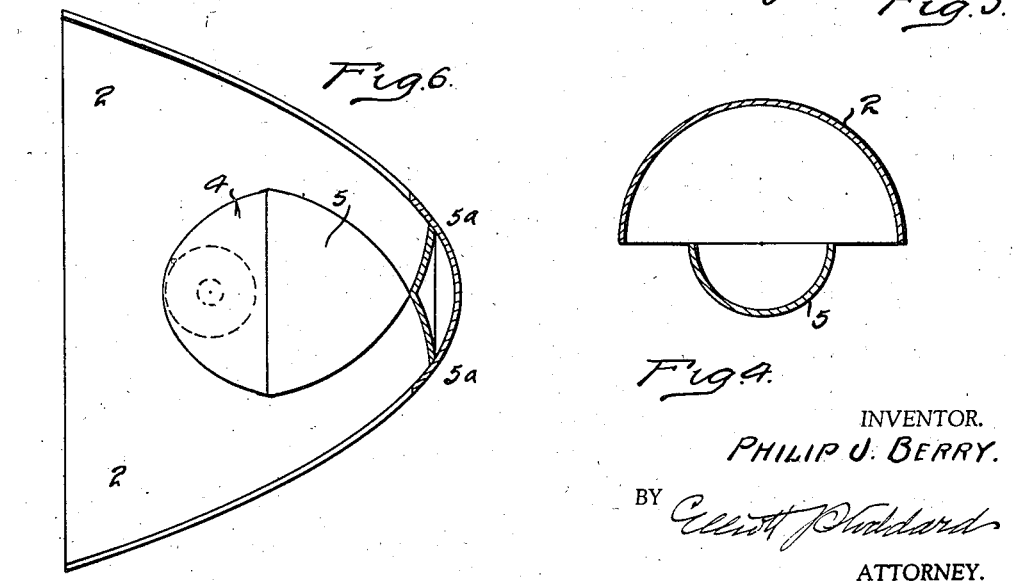
INVENTOR.
PHILIP J. BERRY.
BY
ATTORNEY.

Oct. 29, 1935.  P. J. BERRY  2,018,829
HEADLIGHT
Filed Dec. 22, 1933  2 Sheets-Sheet 2
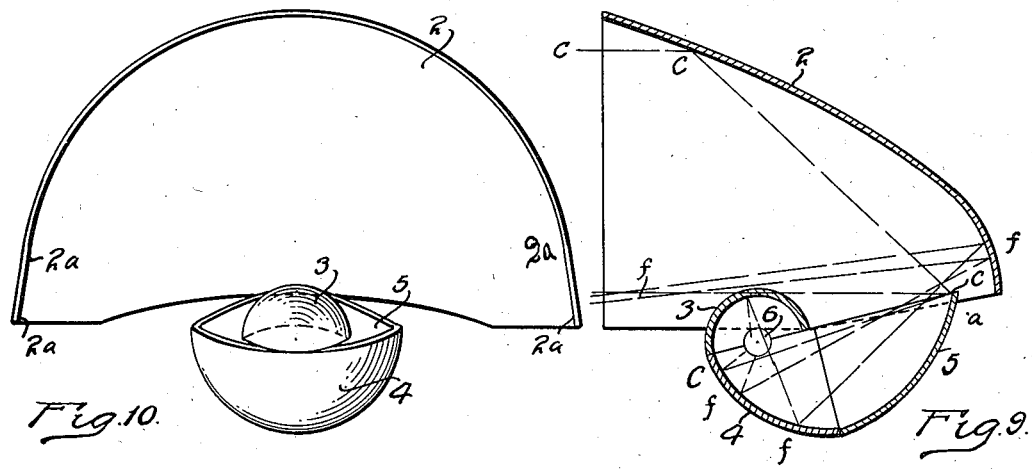
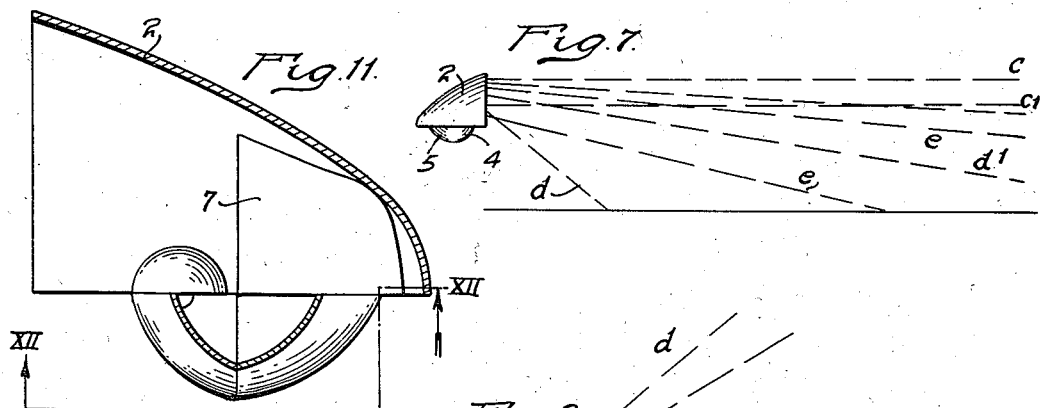
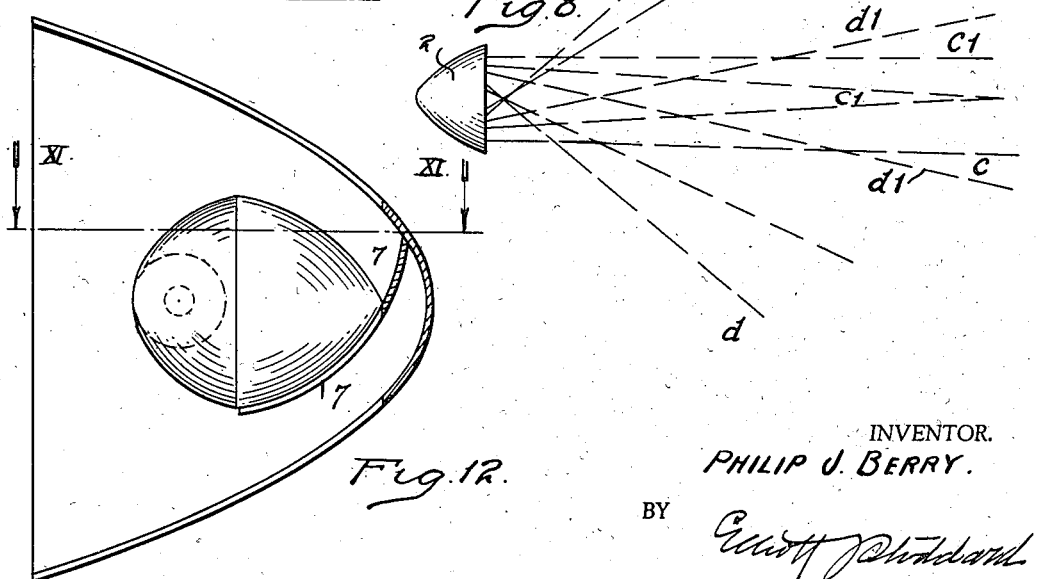
INVENTOR.
PHILIP J. BERRY.
BY
ATTORNEY.

Patented Oct. 29, 1935

2,018,829

UNITED STATES PATENT OFFICE

2,018,829

HEADLIGHT

Philip J. Berry, Detroit, Mich.

Application December 22, 1933, Serial No. 703,507

5 Claims. (Cl. 240—41.1)

My invention relates to headlights and an object of my improvements is to control the disposition of the light so that it shall properly illuminate the space in front of an automobile without producing an objectional glare and even when the source of light has substantial dimensions.

I secure this object by the apparatus illustrated in the accompanying drawings, in which:—

Figure 1 is a sectional elevation of an apparatus embodying my invention, the section being taken in a vertical plane through the axis of the principal reflector.

Figures 2, 3 and 4 are, respectively, sections on the lines II, III, and IV, Figure 1.

Figure 5 is a view similar to Figure 1 illustrating a modified construction.

Figure 6 is an inverted plan view of Figure 5, partly cut away as indicated by the line VI, VI.

Figure 7 is a diagram showing the location of the rays of light in front of the automobile and in a vertical plane passing through the axis of the main reflector.

Figure 8 is a plan view of Figure 7.

Figure 9 is a view similar to Figure 1 illustrating a second modified construction.

Figure 10 is an elevation looking from the left of Figure 9.

Figure 11 is a view similar to Figure 1 illustrating a third modified construction.

Figure 12 is an inverted plan view of Figure 11, partly in section as indicated by the line XII, XII, Figure 11.

2 is a parabolic reflector having the axis A—A and the focus $a$.

3 is a hemispherical reflector opening downward and having its center upon the axis A—A, a convenient distance from the focus $a$.

4—4 is a reflector having the shape, in the plane of Figure 1, of a portion of an ellipse having its foci at the center of the reflector 3 and at the focus $a$, its wall forming a continuation of the wall of the reflector 3 below the same, in said plane.

5—5 is a reflector having the shape, in the plane of Figure 1, of a portion of an ellipse having one of its foci at the center of the reflector 3 and its other focus $b$ located upon its axis inclining about 10 or 15 degrees from a right angle to the axis A—A and toward the focus $a$, and terminating at said focus. The wall of the reflector 5—5 forms a continuation of that of the reflector 4—4 and at its rear upper portion forms a reflecting surface at the focus $a$.

The walls of the above named reflectors are in surfaces described by the elements shown in section, revolved about the axis A—A through an angle of 180 degrees.

6 is a source of light located at the center of the reflector 3. This may be an incandescent lamp bulb and in any case will have substantial dimensions. I have represented it diagrammatically by a circle of exaggerated size for the sake of clearness.

Light coming from the center of the reflector 3 will strike the surface at right angles and be reflected radially, but the rays from points slightly outside of the center will be reflected somewhat out of a radial line.

A portion of the light rays will emanate from, or come through, the center of the lamp 6 and a part of these will strike against the reflecting surface 4—4 and be reflected directly to the other focus of the ellipse, that is, to the focus $a$ of the parabolic reflector 2, and will be there reflected from a portion of the reflector 5—5 to the surface of the reflector 2 and from that surface will be projected horizontally forward. Such a ray is indicated by the lines $c, c, c, c$, and is reflected from the upper part of the reflector 4—4 and a similar ray strikes said reflector near its lower edge and is reflected as indicated by the lines $c1, c1, c1, c1$. Thus all said light rays will be projected horizontally forward between the approximate limits of the horizontal portions of the lines $c$ and $c1$.

A second portion of the rays from the center of the light 6 will strike directly upon the reflector 5—5 and will be reflected to the surface of the reflector 2 and from thence forward and downwardly as represented by the lines $d, d, d$ and $d1, d1, d1$. These rays and those from the intervening portions of the surface of the reflector 5—5 will be thrown forward and downwardly at varying angles so that they will cross each other and then spread out laterally and vertically.

The rays of light striking the surface of the reflector 4—4, from the side of the source 6 remote from the focus $a$, will be reflected and strike the surface of the reflector 5—5, below and in front of its upper edge and will be reflected to the surface of the reflector 2 and forward and slightly downward as represented by the lines $e, e, e, e$.

Some rays coming from the source 6 at points on the side of the center toward the focus $a$, will strike the reflecting surface 4—4 and be there reflected directly to the reflector 2 and then forward and downwardly as indicated by the lines $f, f, f$. Thus striking against the outer surface of the reflector 3, which may or may not be itself a reflecting surface at this point.

Other rays from similar points on both sides of the center will strike against the reflecting surface 5—5, and will be reflected upward against the parabolic surface 2 and then forward and downward at slightly different angles than the rays from the center of the source of light striking against said surface.

Thus the light will be distributed as shown in Figures 7 and 8, all of the light being at or below the horizontal and properly distributed upon the road bed and road side and in the space in front of the automobile to observe an approaching vehicle or other object.

In Figures 5 and 6 I have illustrated a modification in which the surface of the reflector 5—5 is extended upward to 5a. In this case the rays f and f' coming from the right of the center of the source of light 6, as shown in Figure 5, will be reflected upon the extended portion of the reflector 5—5 and from there to the surface of the reflector 2 and from this surface forward and slightly upward, so that to secure a horizontal projection of these rays the whole apparatus would be turned slightly forward as shown in Figure 5.

In Figures 9 and 10 I have shown a second construction in which the combined reflectors 3, 4 and 5 are slightly rotated about an axis through a, to bring the source of light 6 lower down. In this case the sides of the reflector 2 are also extended downward as indicated at 2a, 2a, Figure 10, and are also bent outward somewhat so that they will reflect any light striking against this portion, somewhat downward. This construction would bring the walls of the reflector 3 low enough so that they would not obstruct any material portion of the reflected light.

In Figures 11 and 12 I have provided a reflecting surface 7 which extends vertically in the reflector 2 so as to deflect more of the light toward one side of the roadway than the other.

While I have described the various reflecting surfaces as having shapes of conic sections, it will be understood that this is for convenience because such shapes theoretically produce the effect desired, but the essential thing is to have these surfaces conserve the purposes described, and the description and claims have this meaning; likewise a physical point is intended including space immediately adjacent to the mathematical point to conserve the purpose of the invention.

What I claim is:—

1. In an apparatus of the kind described, a parabolic reflector, a source of light located approximately on the axis of said reflector, a hemispherical reflector covering said source of light on the side thereof toward the first named reflector, a reflector opposite the open side of said hemispherical reflector, its wall being formed as a portion of an ellipsoid having its foci at said source of light and the focus of the first mentioned reflector, and a reflector in the shape of a part of an ellipsoid having one focus at the source of light and the other focus revolved outside the parabolic reflector and extending from the reflector opposite the opening of the hemispherical reflector to the focus of the parabolic reflector.

2. In an apparatus of the kind described, the combination of a paraboloidal reflector, a source of light spaced from the focal point of said reflector in front of said point or toward the larger part of said reflector, a hemispherical reflector having said source of light at the center thereof, an ellipsoidal reflector opposite the open side of said hemispherical reflector having its foci at said source of light and at the focus of the first mentioned reflector and a reflecting surface extending from the focus of said paraboloidal reflector adapted to reflect the light to said paraboloidal reflector to be reflected therefrom parallel to the axis of the same substantially as and for the purpose described.

3. In an apparatus of the kind described, the combination of a paraboloidal reflector, a source of light spaced from the focal point of said reflector in front of said point or toward the larger part of said reflector, a hemispherical reflector having said source of light at the center thereof, an ellipsoidal reflector opposite the open side of said hemispherical reflector having its foci at said source of light and at the focus of the first mentioned reflector, a reflecting surface extending from the focus of said paraboloidal reflector adapted to reflect the light to said paraboloidal reflector to be reflected therefrom parallel to the axis of the same, and a reflecting surface between said ellipsoidal reflector and the focus of said paraboloidal reflector adapted to properly reflect the light to said paraboloidal reflector, substantially as and for the purpose described.

4. In an apparatus of the kind described, a reflector of the shape of the surface of a paraboloid upon one side of a plane through its axis, a source of light spaced from the focal point of said reflector, in front of said point, or toward the larger part of said reflector, a hemispherical reflector covering said source of light on the side thereof toward the first named reflector, so located that said source of light shall be at its center and its periphery spaced from the focus of the first named reflector, an ellipsoidal reflector located opposite the open side of said hemispherical reflector and having its foci at said source of light and the focus of the first named reflector whereby light is reflected from said ellipsoidal reflector to the focus of said parabolic reflector, and a reflector extending from the focus of said parabolic reflector adapted to reflect the light to said parabolic reflector to be reflected therefrom parallel to the axis of the same substantially as and for the purpose described.

5. In an apparatus of the kind described, a reflector of the shape of the surface of a paraboloid upon one side of a plane through its axis, a source of light spaced from the focal point of said reflector, in front of said point, or toward the larger part of said reflector, a hemispherical reflector covering said source of light on the side thereof toward the first named reflector, so located that said source of light shall be at its center and its periphery spaced from the focus of the first named reflector, an ellipsoidal reflector located opposite the open side of said hemispherical reflector and having its foci at said source of light and the focus of the first named reflector and a reflector extending from the reflector opposite the opening of the hemispherical reflector to the focus of the parabolic reflector adapted to properly direct the light that falls thereon whereby light is reflected from said ellipsoidal reflector to the focus of said parabolic reflector, and a reflector extending from the focus of said parabolic reflector adapted to reflect the light to said parabolic reflector to be reflected therefrom parallel to the axis of the same substantially as and for the purpose described.

PHILIP J. BERRY.